March 28, 1939. E. BUGATTI 2,151,835
RECIPROCATING PISTON ENGINE
Filed April 2, 1937
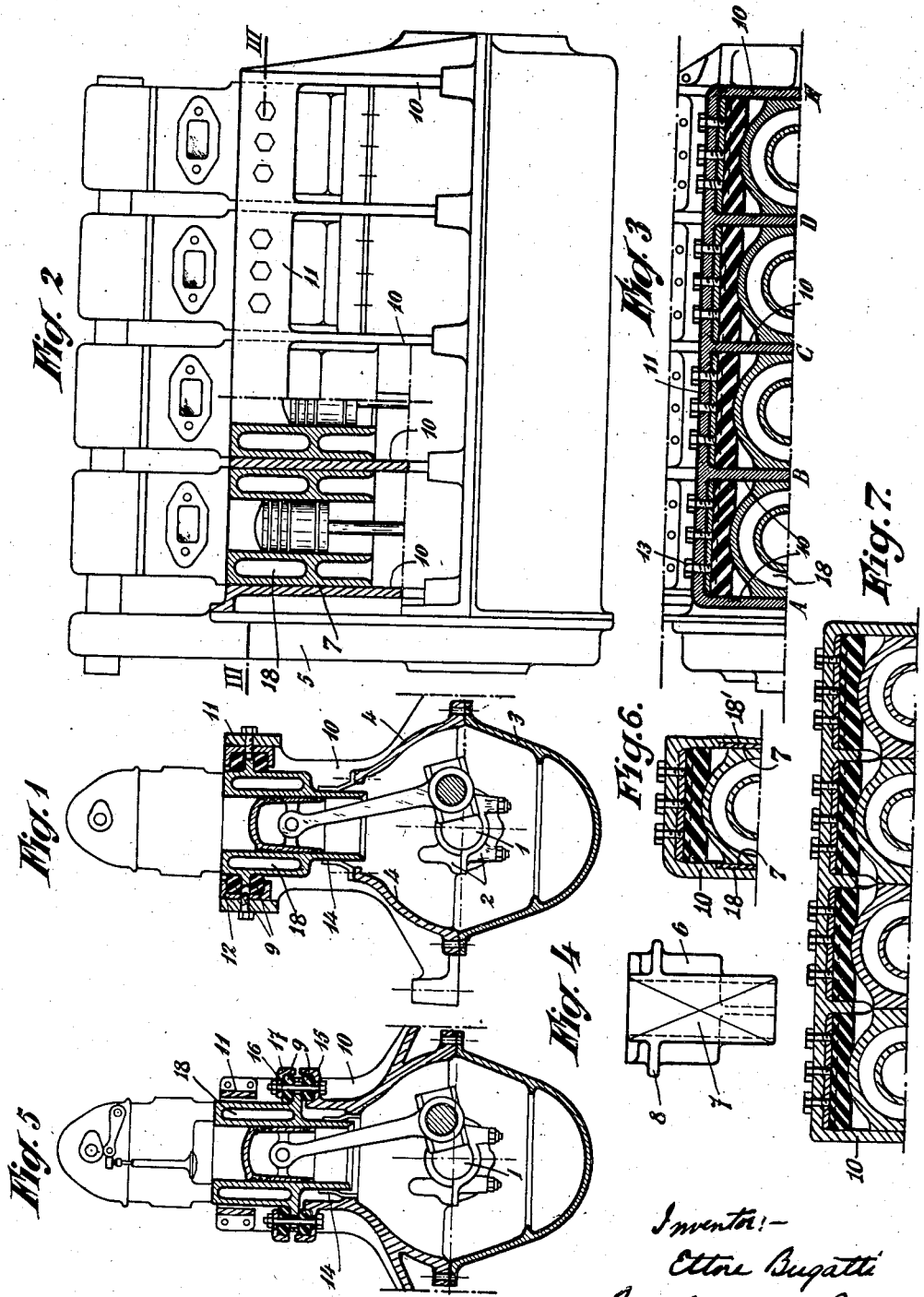
Inventor:—
Ettore Bugatti
By Mauro + Lewis
Attorneys Patented Mar. 28, 1939

2,151,835

UNITED STATES PATENT OFFICE 2,151,835

RECIPROCATING PISTON ENGINE

Ettore Bugatti, Molsheim, France

Application April 2, 1937, Serial No. 134,656
In France April 18, 1936

12 Claims. (Cl. 123—192)

In explosion engines or in internal combustion engines such as Diesel engines, a shock is produced at the time of ignition as a consequence of the quick development of a very high pressure, which involves a periodical shaking of the joints provided between the cylinder and the crankshaft operated by the piston. This action, which as a rule is regular, is occasionally marked by anomalies corresponding to violent shocks produced by premature ignitions. This involves an excessive fatigue of the assembling elements interposed between the cylinder and the crankcase support and even possibilities of breaking. In steam engines, the breaking of cylinder ends by "rushes of water" in the case of water being driven along by steam or when the engine is started after a long period of stopping are well known accidents.

The object of the present invention is to provide an improvement to piston machines with a view to eliminating the disadvantages just above mentioned. This improvement applies to all machines of this type in which a high pressure can be quickly established in the cylinder containing the piston. Therefore, it is merely with a view to facilitating explanations that I will refer only to explosion or internal combustion engines in the following description.

The improvement according to the present invention consists essentially in giving the cylinder end upon which the pressure is acting a possibility of moving elastically with respect to the crankshaft or inversely in such manner that the distance between these two elements of the engine or machine can vary temporarily by a small amount.

This result can be obtained in different manners. According to a preferred embodiment of the invention, I attach the cylinder to the frame supporting the shaft through connecting means comprising parts capable of undergoing slight elastic deformations under the influence of shocks. For instance, I will make use of bars capable of bending of, elongating, of being twisted, in an elastic manner, or of elements capable of being crushed or expanded in an elastic manner, or again I will associate with the connecting means at least one shock absorbing device, such as hydraulic shock absorbers, which can be fed by means of a pump, and so on. I may, for instance, make use of metallic or non-metallic springs or of a plastic material. Rubber or its equivalents are especially valuable from different points of view (mechanical qualities, anti-vibrating and anti-noise properties, and so on).

It is generally advantageous to provide for a possibility of elastic displacement of the cylinder with respect to the driving shaft not only in the direction of the axis of the cylinder but also, to a certain degree, transversely to this axis. The maximum value of the displacement or displacements in the main direction and in the transverse directions will be determined in advance and abutments, preferably completed by adjustment devices can be employed for enabling of modifying the amplitude of the maximum displacements of the parts. I may, for instance, so arrange things, through a suitable adjustment, that a substantial displacement is possible only as a result of a shock more violent than the shocks that occur under normal conditions, that is to say, for instance, as a result of a shock corresponding to a premature ignition, in the case of an explosion engine or an internal combustion engine.

In an embodiment of the invention, the cylinder is provided with peripheral lugs, which may be combined together so as to form one or several flanges or ring elements and which are nipped between blocks of rubber or an equivalent material backed by supports rigid with the frame which carries the crankshaft. In a modification, these blocks are inserted between the fixation lugs.

Of course, the inverse arrangement might be employed, that is to say the fixation lugs might be rigid with the frame supporting the engine shaft. Rubber may, in the known manner, be placed in position in a stressed state. The connection may be completed by elements such as bolts which, among other functions, may perform that of limiting the displacements and ensuring safety.

Preferably, I provide means for keeping the cylinder axis exactly in a plane at right angles to the engine shaft. For this purpose, I may provide a shoe and slideway connection between the cylinder and the frame carrying the engine shaft, and, in particular, provide between these two elements of the machine, planed surfaces extending at right angles to the axis of the engine shaft and bearing upon each other. Thus the cylinder may be housed in a chamber limited, in the longitudinal direction of the shaft, by two plane surfaces adapted for slidable engagement with two corresponding plane surfaces of the cylinder, and, in the transverse direction, by two other surfaces against which bear the elastic fittings limiting the transverse displacements of the cylinder and which may serve at the same time to permit limited displacements of the cylinder in the direction of its length. The two first mentioned surfaces belong preferably to guard plates which are rigid or integral with the frame that supports the engine shaft and are, for instance, cast integral with said frame. These plates and/or the portions of the cylinder cooperating therewith may, if need be, be provided with friction elements which brake the relative displacements of the cylinder and of said plates. The two other surfaces may also belong to pieces cast integral with the frame or, as a modification, rigidly fixed thereto. Between these two last mentioned surfaces and the elastic fittings, I may insert small plates adjustable for instance by means of bolts or screws.

The invention extends to the new articles of manufacture constituted by the cylinders arranged in order to be elastically suspended in the manner just above described.

Of course, if the distribution elements associated with the cylinder are controlled from the engine shaft, precautions are to be taken in order that the distribution should not be perturbed as a consequence of the lack of fixity of the cylinder with respect to the shaft. For this purpose, it will be advantageous to make use of the arrangement described in my copending application filed of even date, Serial No. 134,655, for "Improvements in distribution control mechanisms". This arrangement consists essentially in making use for every cylinder of a hollow cam-shaft and in controlling said shaft through the intermediate of a spindle projecting freely into the shaft bore and coupled with said shaft through a universal joint.

It is easy to construct a power plant or multi-cylinder engine in which the various cylinders are mounted individually as above explained. For instance the frame of the engine may include a frame having compartments or cells formed therein for receiving the respective cylinders. In a modification, two adjacent cylinders or a group of a greater number of cylinders are housed in the same cell of the frame, in which case the end cylinders bear laterally and on the outer side thereof against the guard plates or transverse members of the frame whereas, through their inner faces, the same cylinders, and the intermediate cylinders, if any, bear against one another.

The frame above mentioned may constitute the upper half of the oil case in an explosion engine or an internal combustion engine.

Other features of the present invention will result from the following detailed descripttion of some specific embodiments thereof.

Preferred embodiments of the present invention will be hereinafter described, with reference to the accompanying drawing, given merely by way of example, and in which:

Fig. 1 shows, in transverse section, a system for elastically connecting a cylinder to the upper part of a case which carries the bearings of the crank-shaft;

Fig. 2 is an elevational view, partly in section, of a multi-cylinder engine made according to the arrangement illustrated by Fig. 1;

Fig. 3 is a horizontal section on the line III—III of Fig. 2;

Fig. 4 is an elevational view of a cylinder shown separately and seen on the side of one of its bearing faces;

Fig. 5 is a view similar to Fig. 1, showing a modification.

Fig. 6 is a fragmentary horizontal section (similar to Fig. 3) illustrating another modification.

Fig. 7 is also a horizontal section (similar to Fig. 3) illustrating a further modification.

In the embodiment of Figs. 1 to 5, I have shown a four cylinder explosion engine in which the frame is made of a single piece provided with cells and having an arch-shaped lower part adapted to form the upper portion of the crank-case. This frame constitutes a support for bearings 2 in which is journaled a crank-shaft whereof one crank is visible at 1. To the bottom of the frame there is fixed, for instance by bolting, a trough 3 which together with the walls 4 of the arch-shaped portion of the frame, forms the oil case of the engine. At regular intervals the frame is provided with plates or slideways 10 disposed in planes at right angles to the axis of the crankshaft. The end plates may be provided with ribs as is shown for the plate on the right hand side of Figs. 2 and 3 and/or strengthened. At least one of these plates may be used for attaching a cover housing for auxiliary members or even it can be integral with such a casing 5 (Figs. 2 and 3), the latter containing, in the example shown, control gears for the timing device. Plates 10, and especially the intermediate plates, which are preferably integral with the frame, may, as an alternative, be fixed rigidly thereto.

In the cells or housings limited by two consecutive plates, are engaged the cylinders 6 one of which is separately shown in Fig. 4. Each cylinder 6 which has a cooling jacket 18, includes two plane faces 7 adapted for slidable engagement with the adjoining faces of two plates 10, and, between these plane faces 7, flanges or lugs 8 projecting from the periphery of the cylinder. These flanges 8 support the cylinder on the frame between the plates 10 and, for this purpose, they are held between two elastic bands or blocks 9, for instance rubber blocks which are supported by the frame. In the example illustrated by Fig. 1, blocks 9 are held in a recess provided in a member 12 rigidly fixed to the frame. For instance member 12 is connected through adjusting means, such as screws 13, with an abutment plate 11 which may be fixed to the frame or, preferably, which consists of a small bar cast integral with the plates 10 which it connects. Thus, in this arrangement, bars 11 act at the same time as abutments opposing transverse displacements of the cylinder, as supports for the cylinders and as distance pieces for plates 10. The cast frame defined by elements 10 and 11 may easily be fixed as a whole to the general frame of the engine, which includes the upper portion of the engine crankcase.

In order that the elastic supports, that is to say, in the present embodiment the rubber elements, should not be exposed to a dangerous rise of temperature, it is advantageous to dispose them at a place which is but little heated or which is cooled. For instance, flanges 8 are provided around the cooling jacket of the cylinder.

Elastic tong-like elements 14, bellows, or any other suitable means ensure the fluid tightness of the crankcase at the places where the cylinders penetrate into said crankcase.

In the preceding description, it has been assumed that the faces 7 of the cylinder were in direct contact with the plates 10 carried by the frame. It is possible, if so desired, according to the present invention, to interpose friction elements 18', to provide a lubrication, if necessary, and so on. This arrangement is shown in Fig. 6, wherein the friction linings 18' are positioned in recesses in the walls of plates 10 between said plates and the surfaces 7 of a cylinder. It is also possible, as shown in Fig. 7, to dispense with one or several of the intermediate plates, in which case two consecutive cylinders bear against each other since these cylinders, maintained by their respective elastic systems cannot mutually influence each other. I may also, where no intermediate plates are used, render elastic blocks 9 continuous from one cylinder to the next one i. e. I may provide one elastic block 9 running along two or more contacting cylinders instead of two or more separate elastic blocks.

Fig. 5 shows a modification in which the abutments 11 are separate from the elastic elements. In this case one of these elastic elements rests upon a bracket 15 of the frame and supports the flange 8, which, in turn is covered by the other elastic element 9. The assembly is completed by bolts 16, extending through holes of flange 8, with a certain play, and compressing the elastic elements between bracket 15 and a pressure distribution piece 17. The lateral displacements of the cylinder are limited by abutments 11 which are, in this example bolted to plates 10.

Of course, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

In the following claims, the word "cylinder" is used to mean a hollow unit having a closed end adapted to define a pressure chamber in combination with a piston operable in the bore of the cylinder, as distinguished from a sleeve or tube open at both ends.

What I claim is:

1. In a multi-cylinder machine having a rotary shaft and a supporting frame for said shaft, the combination of a cylinder; a piston reciprocably mounted in the barrel portion of the cylinder unit; means to operate the rotary shaft from the piston; and resilient means, adapted to enable bidirectional bodily movements of the cylinder unit in axial direction with respect to the frame, for attaching said cylinder unit to said frame.

2. In a multi-cylinder machine having a rotary shaft and a frame provided with a cell, adapted to support the shaft, the combination of a cylinder housed in the cell, having guiding engagement with a portion of the wall of said cell so as to have its axis maintained in a plane at right angles to the rotary shaft; a piston reciprocably mounted in the cylinder; means to operate the rotary shaft from the piston; and resilient means, adapted to enable bidirectional bodily movements of the cylinder in axial direction with respect to the frame as well as bodily side motions of the axis of the same in the said plane, for attaching said cylinder to said frame.

3. The combination of claim 2, further comprising friction linings interposed between the guiding portion of the wall of the cell and the cooperating portion of the cylinder.

4. In a multi-cylinder machine having a crankshaft and a rigid frame, the combination of a plurality of separate cylinder units each of which consists of fixedly associated head and barrel portions forming a piston working chamber; a piston in each barrel portion; means between each piston and the crankshaft, to operate the latter from the former; and resilient means for attaching separately each cylinder unit to the frame, adapted to enable slight bodily motion of said cylinder unit away from the crankshaft.

5. In a machine, the combination of a rotary shaft; a rigid frame having a plurality of housings the axes of which are at right angles to, and meet the axis of the rotary shaft; means for bearing the rotary shaft in the frame; a cylinder unit slidably fitted in each housing, said unit consisting of fixedly associated head and barrel portions, forming a piston working chamber; a working piston in each barrel portion; means to operate the crankshaft from each piston; and separate flexible means for holding each cylinder unit at a substantially constant distance from the rotary shaft, including resilient buffer means to cushion the bodily movement of said cylinder unit away from the rotary shaft.

6. In a machine of the type described, the combination of a frame; a cylinder formed with side shoes; a housing in the frame for said cylinder having machined surfaces adapted for contacting relation with the cylinder shoes so as to enable sliding movements of the cylinder in said housing; and means for resiliently attaching the cylinder to the frame, including (a) at least one lug, elastic material arranged to nip the lug and (b) a holder for the elastic material, one of the two elements (a) and (b) being rigid with the cylinder and the other being rigid with the frame.

7. The combination of claim 6, the holder having opposite surfaces for gripping the elastic material therebetween and means for adjusting the span between said surfaces.

8. The combination of claim 6, further comprising means for adjusting the position of the holder with respect to the member with which it is rigid.

9. In a machine of the type described, the combination of a frame housing having oppositely disposed friction surfaces; a cylinder provided on opposite sides of its wall, with shoes adapted for contacting relation with the friction surfaces in the frame housing, and also provided with at least one outwardly projecting flange; a jaw adapted to embrace said flange, attached to the housing; and resilient means operatively interposed between the jaw and the flange for cushioning relative movement between the cylinder and the housing.

10. In a thermic machine having a frame and a cylinder having a cooled wall, a device for resiliently attaching the cylinder to the frame which comprises, in combination, a first rigid element; a second rigid element shaped to encase the first element; heat-sensitive resilient material operatively interposed between the said elements for cushioning their relative displacements, one of the said elements being rigid with the frame while the other element is rigid with the cooled wall of the cylinder, whereby the resilient material is protected against excessive heat from the cylinder.

11. In a machine of the type described, a frame; a crankshaft rotatably mounted in the frame; a plurality of cylinder units each of which consists of fixedly associated head and barrel portions forming a piston working chamber, each cylinder unit being slidably mounted in the frame, for slight bodily movement to and away from the crankshaft; a piston in each barrel portion, operated by fluid pressure in the corresponding fluid working chamber; means interposed between each piston and the crankshaft for rotating the latter from the former; and individual resilient buffer means for cushioning the relative movement between each cylinder unit and the frame, adapted to enable slight movement of said cylinder unit away from the crankshaft, independently of movement of any other cylinder unit, upon rise in mean effective pressure in the fluid working chamber of said cylinder unit.

12. In a multi-cylinder engine of the type described, a line of separately movable cylinder units, each of which is arranged in slidable, contacting relation with adjacent unit in the line; a frame; an abutment rigid with the frame, at each end of the cylinder unit line so as to prevent any motion of the cylinder units along said line; and resilient means on each side of the cylinder unit line, having operative engagement with each cylinder unit in the line and with the frame, for limiting and cushioning movement of any cylinder unit with respect to the frame in any direction at right angles to the line.

ETTORE BUGATTI.